US012452286B2

(12) United States Patent
Das et al.

(10) Patent No.: US 12,452,286 B2
(45) Date of Patent: Oct. 21, 2025

(54) METHODS, SYSTEMS, AND COMPUTER READABLE MEDIA FOR ZERO TRUST NETWORK ACCESS (ZTNA) TESTING USING TEST SYSTEM WITH SIMULATED OR EMULATED IDENTITY PROVIDER

(71) Applicant: Keysight Technologies, Inc., Santa Rosa, CA (US)

(72) Inventors: Sawan Das, Kolkata (IN); Partha Majumdar, West Hills, CA (US); Tudor Simionescu, Bucharest (RO); Rudrarup Naskar, Kolkota (IN)

(73) Assignee: KEYSIGHT TECHNOLOGIES, INC., Santa Rosa, CA (US)

( * ) Notice: Subject to any disclaimer, the term of this patent is extended or adjusted under 35 U.S.C. 154(b) by 151 days.

(21) Appl. No.: 18/375,245

(22) Filed: Sep. 29, 2023

(65) Prior Publication Data
US 2025/0112946 A1    Apr. 3, 2025

(30) Foreign Application Priority Data

Sep. 28, 2023 (RO) ............................... a 2023 00533

(51) Int. Cl.
*H04L 9/40* (2022.01)
(52) U.S. Cl.
CPC .......... *H04L 63/1433* (2013.01); *H04L 63/08* (2013.01)
(58) Field of Classification Search
CPC .................... H04L 63/1433; H04L 63/08
(Continued)

(56) References Cited

U.S. PATENT DOCUMENTS 6,907,546 B1 * 6/2005 Haswell .............. G06F 11/3684
717/124
8,392,982 B2 * 3/2013 Harris ..................... H04L 63/20
709/227
(Continued)

FOREIGN PATENT DOCUMENTS

WO    2020207517 A1    10/2020

OTHER PUBLICATIONS

Qazi, Study of Zero Trust Architecture for Applications and Network Security, 2022, IEEE (Year: 2022).
(Continued)

*Primary Examiner* — Dant B Shaifer Harriman (57) ABSTRACT

A method for ZTNA testing using a simulated or emulated IdP includes generating and transmitting, from an emulated client implemented by a network traffic emulation platform and to a server, an emulated application traffic message. The method further includes receiving, from a PEP under test, a message redirecting the emulated client to a simulated or emulated IdP and including an authentication request. The method further includes generating, by the simulated or emulated IdP, an authentication response and providing the authentication response to the emulated client. The method further includes providing, to the PEP under test, a response to the authentication request from the PEP under test. The method further includes receiving a response including an authenticated cookie from the PEP under test, generating and transmitting, to the server via the PEP under test, a request including the authenticated cookie, and receiving a response from the server.

20 Claims, 7 Drawing Sheets

(58) Field of Classification Search
USPC .......................................................... 726/1
See application file for complete search history.

(56) References Cited

U.S. PATENT DOCUMENTS

| | | | | |
|---|---|---|---|---|
| 8,875,243 | B1* | 10/2014 | Cherukumudi | H04L 67/08 |
| | | | | 713/168 |
| 11,100,503 | B2* | 8/2021 | Iyer | G06Q 20/401 |
| 11,240,225 | B1* | 2/2022 | Seever | H04L 63/0815 |
| 11,323,438 | B2 | 5/2022 | Ray et al. | |
| 11,570,172 | B2 | 1/2023 | Specht et al. | |
| 11,647,010 | B2 | 5/2023 | Cheng et al. | |
| 11,973,787 | B2* | 4/2024 | Compagna | G06F 11/3688 |
| 2010/0242105 | A1* | 9/2010 | Harris | H04L 63/105 |
| | | | | 709/229 |
| 2010/0290476 | A1* | 11/2010 | Brindle | H04L 63/0209 |
| | | | | 370/401 |
| 2011/0225267 | A1* | 9/2011 | Ohashi | H04L 63/08 |
| | | | | 709/219 |
| 2016/0266915 | A1* | 9/2016 | Morelli | H04L 67/08 |
| 2018/0295134 | A1* | 10/2018 | Gupta | H04L 67/56 |
| 2021/0336959 | A1 | 10/2021 | Shah et al. | |
| 2022/0210173 | A1 | 6/2022 | Katmor | |
| 2022/0239640 | A1 | 7/2022 | Wang et al. | |
| 2022/0400114 | A1 | 12/2022 | Sreedhar et al. | |
| 2023/0053702 | A1 | 2/2023 | Gupta | |
| 2023/0079444 | A1 | 3/2023 | Parla | |
| 2023/0123781 | A1 | 4/2023 | Kaimal | |
| 2023/0129466 | A1 | 4/2023 | Moore | |
| 2024/0364691 | A1* | 10/2024 | Majumdar | H04L 63/20 |
| 2025/0016666 | A1* | 1/2025 | Zaks | H04L 12/4633 |
| 2025/0094519 | A1* | 3/2025 | Kol | H04L 67/59 |
| 2025/0112946 | A1* | 4/2025 | Das | H04L 63/08 |

OTHER PUBLICATIONS

Zanasi et al, A Zero Trust approach for the cybersecurity of Industrial Control Systems, 2022, IEEE (Year: 2022).

Non-Final Office Action for U.S. Appl. No. 18/142,572 (Mar. 10, 2025).

Commonly-Assigned, co-pending U.S. Appl. No. 18/142,572 for "Methods, Systems, and Computer Readable Media for Zero Trust Network Access (ZTNA) Testing Using Application-Independent Authentication Profiles" (Unpublished, filed May 2, 2023).

Fu, et al., "Application Independent Identity Management", IEEE, pp. 625-628 (2010).

Keysight Technologies, "Keysight CyPerf", Distributed, Elastic Network Performance and Security Validation, pp. 1-12 (May 2021).

Notice of Allowance and Examiner-Initiated Interview Summary for U.S. Appl. No. 18/142,572 (Aug. 26, 2025).

* cited by examiner

METHODS, SYSTEMS, AND COMPUTER READABLE MEDIA FOR ZERO TRUST NETWORK ACCESS (ZTNA) TESTING USING TEST SYSTEM WITH SIMULATED OR EMULATED IDENTITY PROVIDER

PRIORITY CLAIM

This application claims the priority benefit of Romanian Patent Application No. a 2023 00533, filed Sep. 28, 2023, and entitled, "METHODS, SYSTEMS, AND COMPUTER READABLE MEDIA FOR ZERO TRUST NETWORK ACCESS (ZTNA) TESTING USING TEST SYSTEM WITH SIMULATED OR EMULATED IDENTITY PROVIDER", the disclosure of which is incorporated herein by reference in its entirety.

TECHNICAL FIELD

The subject matter described herein relates to ZTNA testing. More particularly, the subject matter described herein relates to methods, systems, and computer readable media for ZTNA testing using a simulated or emulated identity provider.

BACKGROUND

ZTNA (Zero Trust Network Access) is a security model for providing remote access to a resource, such as a web server, that is based on the principle that no one seeking to access the resource can be trusted, irrespective of location, IP address, etc. Therefore, every access to the resource or application must be authenticated.

ZTNA achieves network authentication in two different ways: client-based ZTNA and clientless ZTNA. Client-based ZTNA requires an authenticated tunnel to be established between the machine that is trying to access resources/applications in a network and a secure gateway in the network. The remote endpoints of the tunnels established with the secure gateway form a perimeter of verified access points, also known as software defined perimeters (SDP). This is achieved by installing a client agent/application on the remote endpoints. The ZTNA clients also use proprietary protocols for communicating with the secure gateways.

Clientless ZTNA does not require an endpoint agent. Clientless ZTNA primarily applies to web-based resource access. The web-based protocol used may include HTTP, HTTPS, HTTP2, HTTP3, etc. Clientless ZTNA can be achieved via communication through web-proxies including, but not limited to explicit proxies, reverse proxies, etc. Clientless ZTNA is also achieved via URL manipulation (e.g., by adding a prefix to the application URL), DNS manipulation (e.g., the application URL in a request to access a network resource is mapped to the IP address of a secure gateway), etc.

Even though the actual message exchanges involved in clientless ZTNA can be vendor- and implementation-specific, clientless ZTNA can be generalized in the following way. All the parties involved in a clientless ZTNA system can be categorized in one of the following categories:
1. Application Client/Web Browser
2. PEP (Policy Enforcement Point)/Secure Gateway
3. IdP (Identity Provider)
4. Application Server In some ZTNA testing, it is desirable to test the performance and functionality of the PEP using an emulated client application and an emulated web server. To test the PEP, the emulated client sends a message to the emulated web server via the PEP. The PEP receives the message and redirects the emulated client to an IdP. The client provides authentication credentials to the IdP in an authentication request, and the IdP verifies the authentication credentials and sends an authentication response to the client. The client then sends the authentication response to the PEP. The PEP responds to the authentication response with an authentication response including an authentication cookie after verifying the authentication status and applying any additional policy that the PEP might apply. The client then sends a request including the authenticated cookie to the web server via the PEP. The PEP receives the request, verifies the cookie, and passes the request to the web server.

One problem with conventional ZTNA testing is that the IdP becomes a performance bottleneck. Conventional ZTNA testing uses a real IdP, and the real IdP is required to authenticate each emulated client request before providing the authenticated cookie that the emulated client can provide to the web server. Such authentication involves an exchange of messages with each emulated client, which can cause a performance bottleneck in the testing, especially when testing the performance of the PEP using multiple simultaneous connections from emulated clients. In addition, communicating with a real IdP, even for test purposes, requires a subscription. Requiring IdP subscriptions for network testing is undesirable.

In light of these and other difficulties, there exists a need for improved methods, systems, and computer readable media for improved ZTNA testing.

SUMMARY

A method for zero trust network access (ZTNA) testing using a simulated or emulated identity provider (IdP) includes generating and transmitting, from an emulated client implemented by a network traffic emulation platform and to a server, an emulated application traffic message. The method further includes receiving, by the emulated client and from a policy enforcement point (PEP) under test and in response to the emulated application traffic message, a message redirecting the emulated client to a simulated or emulated IdP and including an authentication request. The method further includes generating, by the simulated or emulated IdP, an authentication response and providing the authentication response to the emulated client. The method further includes providing, by the emulated client and to the PEP under test, a response to the authentication request from the PEP under test. The method further includes receiving, by the emulated client, a response from the PEP under test. The method further includes generating and transmitting, by the emulated client and to the server via the PEP under test, a request including the authenticated cookie. The method further includes receiving, by the emulated client, a response from the server.

According to another aspect of the subject matter described herein, the simulated or emulated IdP comprises a simulated IdP implemented by the network traffic emulation platform and wherein providing the authentication response to the emulated client includes providing the authentication response via an application programming interface (API) provided by the emulated client.

According to another aspect of the subject matter described herein, the simulated or emulated IDP comprises an emulated IdP that implements authentication protocol exchanges with the emulated client.

According to another aspect of the subject matter described herein, the emulated IdP is implemented on the network traffic emulation platform.

According to another aspect of the subject matter described herein, the emulated IdP is implemented on a computing platform separate from the network traffic emulation platform.

According to another aspect of the subject matter described herein, receiving the authentication request includes receiving a security association markup language (SAML) request.

According to another aspect of the subject matter described herein, generating the authentication response includes generating an SAML response.

According to another aspect of the subject matter described herein, the method for ZTNA testing using a simulated or emulated IdP includes, at the network traffic emulation platform, simultaneously emulating a plurality of flows between emulated clients and servers including authentication flows with one or more simulated or emulated IdPs.

According to another aspect of the subject matter described herein, the server comprises an emulated server.

According to another aspect of the subject matter described herein, the server comprises a non-emulated server.

According to another aspect of the subject matter described herein, a system for zero trust network access (ZTNA) testing using a simulated or emulated identity provider (IdP) is provided. The system includes a network traffic emulation platform including at least one processor and a memory. The system further includes a simulated or emulated IdP. The system further includes an emulated client implemented by the at least one processor for generating and transmitting, to a server, an emulated application traffic message, receiving, from a policy enforcement point (PEP) under test and in response to the emulated application traffic message, a message redirecting the emulated client to the simulated or emulated IdP and including an authentication request. The simulated or emulated IdP is configured to generate an authentication response and provide the authentication response to the emulated client. The emulated client is configured to provide, to the PEP under test, a response to the authentication request from the PEP under test, receive a response including the authenticated cookie from the PEP under test, generate and transmit, to the server via the PEP under test, a request including the authenticated cookie, and receive a response from the server.

According to another aspect of the subject matter described herein, the simulated or emulated IdP comprises a simulated IdP implemented by the network traffic emulation platform and providing the authentication response to the emulated client includes providing the authentication response via an application programming interface (API) provided by the emulated client.

According to another aspect of the subject matter described herein, the simulated or emulated IdP comprises an emulated IdP that implements authentication protocol exchanges with the emulated client.

According to another aspect of the subject matter described herein, the emulated IdP is implemented on the network traffic emulation platform.

According to another aspect of the subject matter described herein, the emulated IdP is implemented on a computing platform separate from the network traffic emulation platform.

According to another aspect of the subject matter described herein, the authentication request includes a security association markup language (SAML) request.

According to another aspect of the subject matter described herein, the authentication response includes an SAML response.

According to another aspect of the subject matter described herein, the network traffic emulation platform is configured to simultaneously emulate a plurality of flows between emulated clients and servers including authentication flows with one or more simulated or emulated IdPs.

According to another aspect of the subject matter described herein, the server comprises an emulated server or a non-emulated server.

According to another aspect of the subject matter described herein, a non-transitory computer-readable medium having stored thereon executable instructions that when executed by a processor of a computer control the computer to perform steps is provided. The steps include generating and transmitting, from an emulated client implemented by a network traffic emulation platform and to a server, an emulated application traffic message; receiving, by the emulated client and from a policy enforcement point (PEP) under test and in response to the emulated application traffic message, a message redirecting the emulated client to a simulated or emulated identity provider (IdP) and including an authentication request. The steps further include generating, by the simulated or emulated IdP, an authentication response and providing the authentication response to the emulated client. The steps further include providing, by the emulated client and to the PEP under test, a response to the authentication request from the PEP under test. The steps further include receiving, by the emulated client, a response from the PEP under test. The steps further include generating and transmitting, by the emulated client and to the server via the PEP under test, a request including the authenticated cookie. The steps further include receiving, by the emulated client, a response from the server.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Exemplary implementations of the subject matter described herein will now be explained with reference to the accompanying drawings, of which.

DETAILED DESCRIPTION

Figure 1:
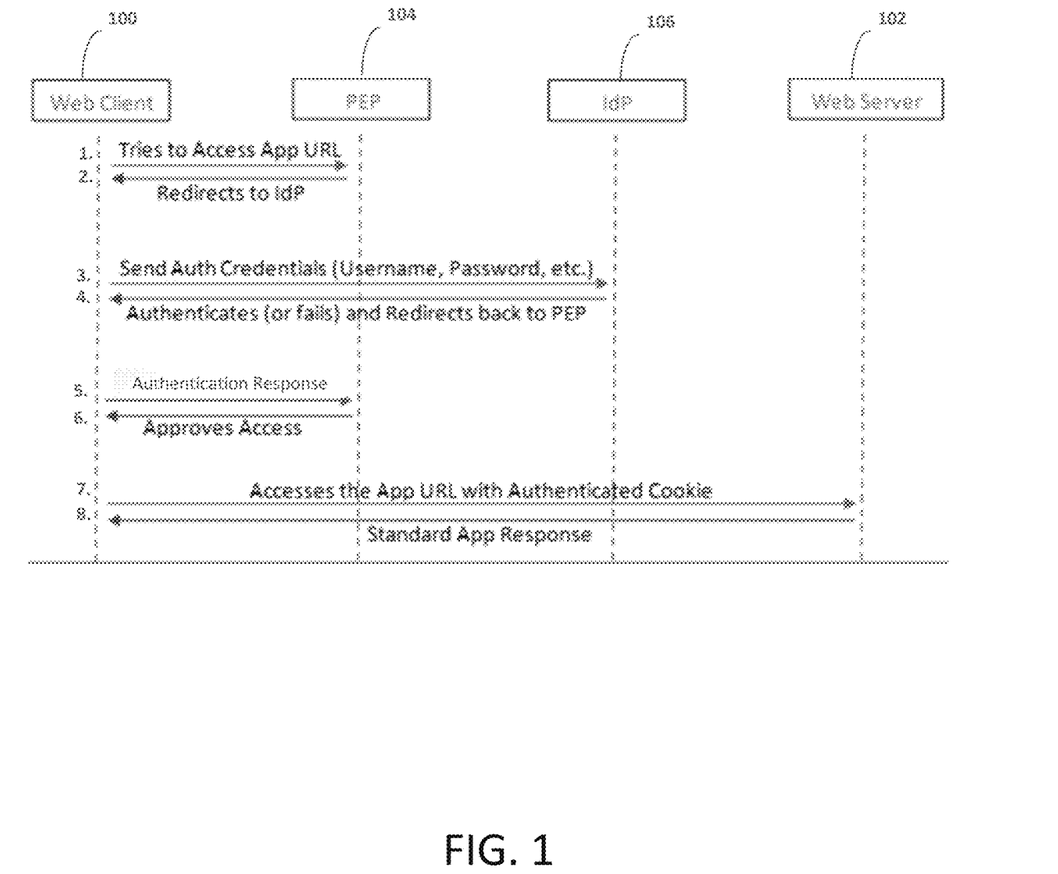
FIG. 1 is a message flow diagram illustrating exemplary messages exchanged in a network with ZTNA security.

In absence of a ZTNA system, a web client communicates directly with a web server. However, in the presence of a ZTNA system, the initial communication becomes more complex, as shown in FIG. 1. In FIG. 1, line 1, a web client 100 first tries to access an application URL, which points to a resource on web server 102, through a PEP 104. If the request is not authenticated, in line 2, PEP 104 redirects the client to an IdP 106. In line 3, web client 100 provides authentication credentials to IdP 106. If the credentials are valid, in line 4, IdP 106 redirects client 100 back to PEP 104 by sending an authentication response. In line 5, web client 100 provides the authentication response to PEP 104, and, in line 6, PEP 104 approves access, provides an authenticated cookie, and redirects client 100 back to the original application URL. In line 7, web client 100 sends a request to the application URL on web server 102. The request includes the authenticated cookie, so PEP 104 passes the request to web server 102. In line 8, web server 102 responds to the request from client 100. Any following requests sent to web server 102 with the authenticated cookie are allowed through PEP 104 (secure gateway) directly to web server 102. So, to test the capability and capacity of PEP 104, the other three components, i.e., the web server, the web client, and the IdP are required.

In traditional test tools, simulating only the application client and the application server is sufficient for assessing capability and measuring some key performance indicators for security system devices, such as firewalls. However, for ZTNA, the traffic through the PEP also depends on the IdP, as explained above. Traditionally, a real IdP is used to test such a PEP. This dependency on a real IdP means additional cost for creating a test bed. Moreover, the capacity of the IdP can be a bottleneck when testing the PEP's capacity. In general, the real IdPs external to the test system that are available as software as a service (SaaS) would apply rate control and limit user count, which could prevent effective capacity testing of a PEP.

Figure 2:
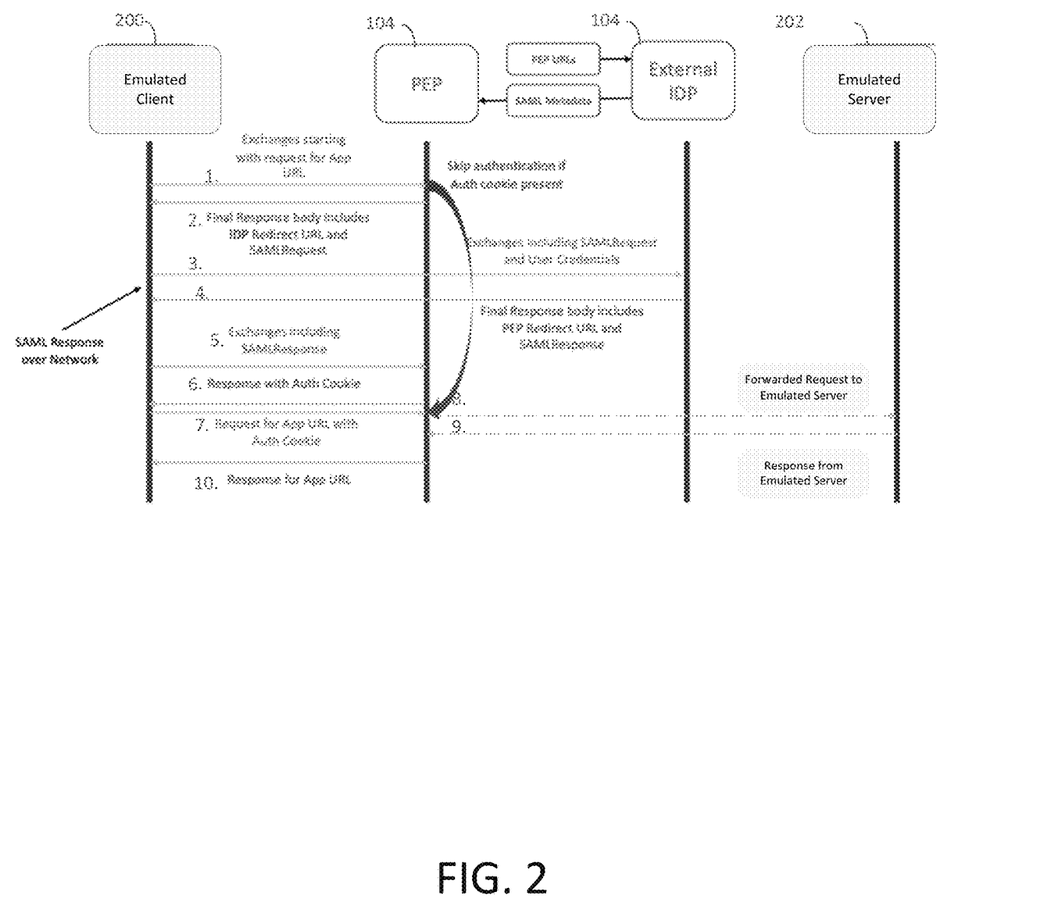
FIG. 2 is a message flow diagram illustrating exemplary messages exchanged in testing a PEP were authentication is performed using a real external IdP.

FIG. 2 is a message flow diagram illustrating ZTNA testing using an emulated client, and emulated server, and an external real IdP to test a PEP. Referring to FIG. 2, as part of the test setup, external (real) IdP 106 is configured with PEP URLs, and PEP 104 is configured with security association markup language (SAML) URLs. In line 1, emulated client 200 attempts to access the URL of the target application residing on emulated server 202 via PEP 104. In line 2, PEP 104 redirects emulated client 200 to IdP 106 and sends an SAML request to emulated client 200. In line 3, emulated client 200 generates and sends an SAML response to PEP 104. SAML is used as an example of an authentication protocol that can be implemented by emulated client 200. Authentication protocols other than SAML can be implemented without departing from the scope of the subject matter described herein.

If the authentication is successful, in line 4, IdP 106 redirects emulated client 200 back to PEP 104. In line 5, emulated client 200 sends an SAML response to PEP 104. In line 6, PEP 104 approves the access and sends a response including the authenticated cookie to emulated client 200. In line 7, emulated client 200 sends a request to the application residing on emulated server 202 with the authenticated cookie. In line 8, PEP 104 receives the request, verifies the cookie, and forwards the request to emulated server 202. In line 9, emulated server 202 responds to the request. In line 10, PEP 104 forwards the response to emulated client 200. For example, emulated client 200 may send an HTTP GET request for all or part of a web page, and the response from emulated server 202 may be an HTTP PUT message with the requested file or files for displaying the web page. It should be noted that the messaging in lines 2-7 can be bypassed if emulated client 200 has the authenticated cookie at the time of sending the initial request to emulated server 202.

To enhance the scalability of the testing scenario illustrated in FIG. 2, instead of using a real external IdP, a simulated or emulated IdP can be used without requiring a subscription to a real IdP, and, in the simulated IdP case, without requiring authentication protocol exchanges between the simulated IdP and the emulated web client. As used herein, the term "simulated IdP" refers to an IdP implemented by the test platform that internally exchanges authentication information with the emulated client to provide the emulated client with an authentication response but that is not required to implement the authentication protocol exchange over the network with the emulated client. The term "emulated IdP" refers to an IdP implemented by the test operator (either on the test platform or on a platform that is connected to and preferably near the test platform) that implements at least a portion of the authentication protocol exchange over the network with the emulated client.

Figure 3:
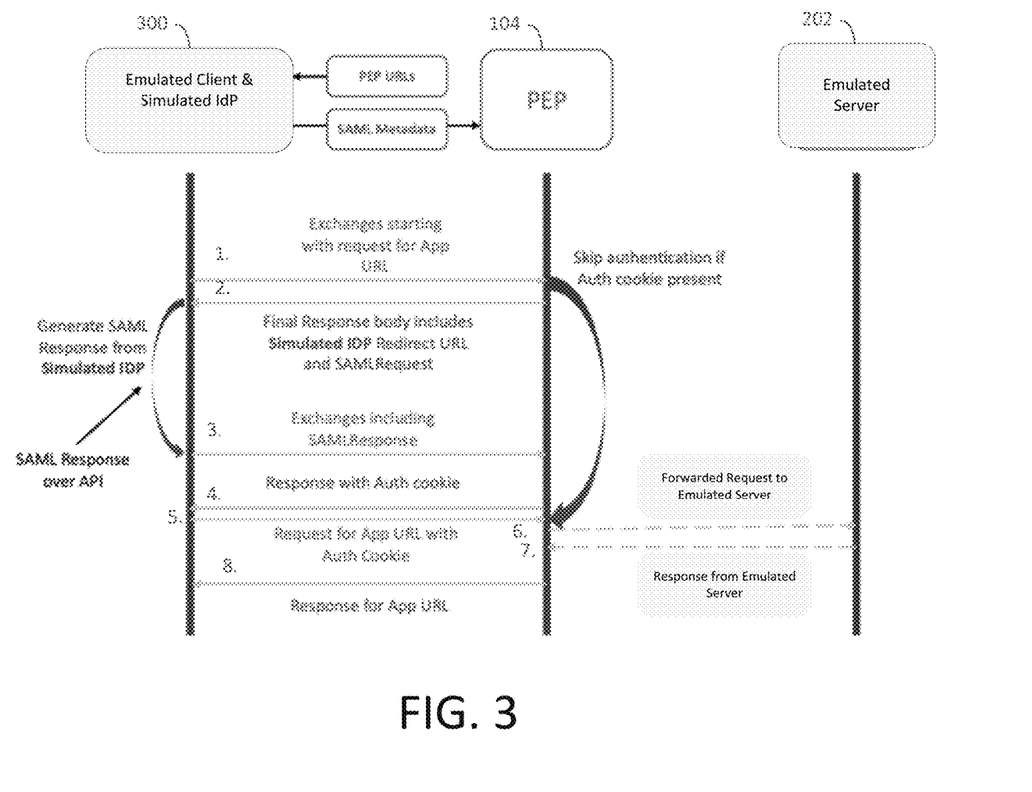
FIG. 3 is a message flow diagram illustrating exemplary messages exchanged in testing a PEP where authentication is performed using a simulated IdP.

FIG. 3 is a message flow diagram illustrating exemplary messages exchanged between an emulated client and IdP, an emulated server, and a PEP under test in performing ZTNA testing of the PEP under test. Referring to FIG. 3, as part of the test setup, the simulated IdP of emulated client and simulated IdP 300 is configured with PEP URLs, and PEP 104 is configured with SAML URLs. In line 1, emulated client and simulated IdP 300 attempts to access the URL of the target application residing on emulated server 202 via PEP 104. In line 2, PEP 104 redirects emulated client and simulated IdP 300 to the URL of the emulated IdP and sends an SAML request to emulated client and simulated IdP 300. In response to receiving the SAML request from PEP 104 via the emulated client of emulated client and simulated IdP 300, in line 2, the simulated IdP of emulated client and simulated IdP 300 generates and sends an SAML response to the emulated client. It should be noted that the SAML response is provided by the simulated IdP to the emulated client using an internal application programming interface (API) provided by the emulated client. The exchange of authentication messages over the network illustrated by lines 3 and 4 in FIG. 2 is avoided. In line 3, emulated client and simulated IdP conducts authentication exchanges with PEP 104, including sending an SAML response to PEP 104.

In line 4, PEP 104 approves the access sends a response to emulated client and simulated IdP 300. In line 5, emulated client and simulated IdP 300 sends a request to the application residing on emulated server 202 with the authenticated cookie. In line 6, PEP 104 receives the request, verifies the cookie, and forwards the request to emulated server 202. In line 7, emulated server 202 responds to the request. In line 8, PEP 104 forwards the response to emulated client and simulated IdP 300. It should be noted that the messaging in lines 2-4 can be bypassed if the emulated client has the authenticated cookie at the time of sending the initial request to emulated server 202.

Using a simulated IdP as illustrated in FIG. 3, authentication protocol exchanges between the emulated client and the simulated IdP can be avoided. In addition, the message flow in FIG. 3 can be replicated using a plurality of emulated clients, the simulated IdP, and the emulated server to perform a capacity or stress test of PEP 104.

Figure 4:
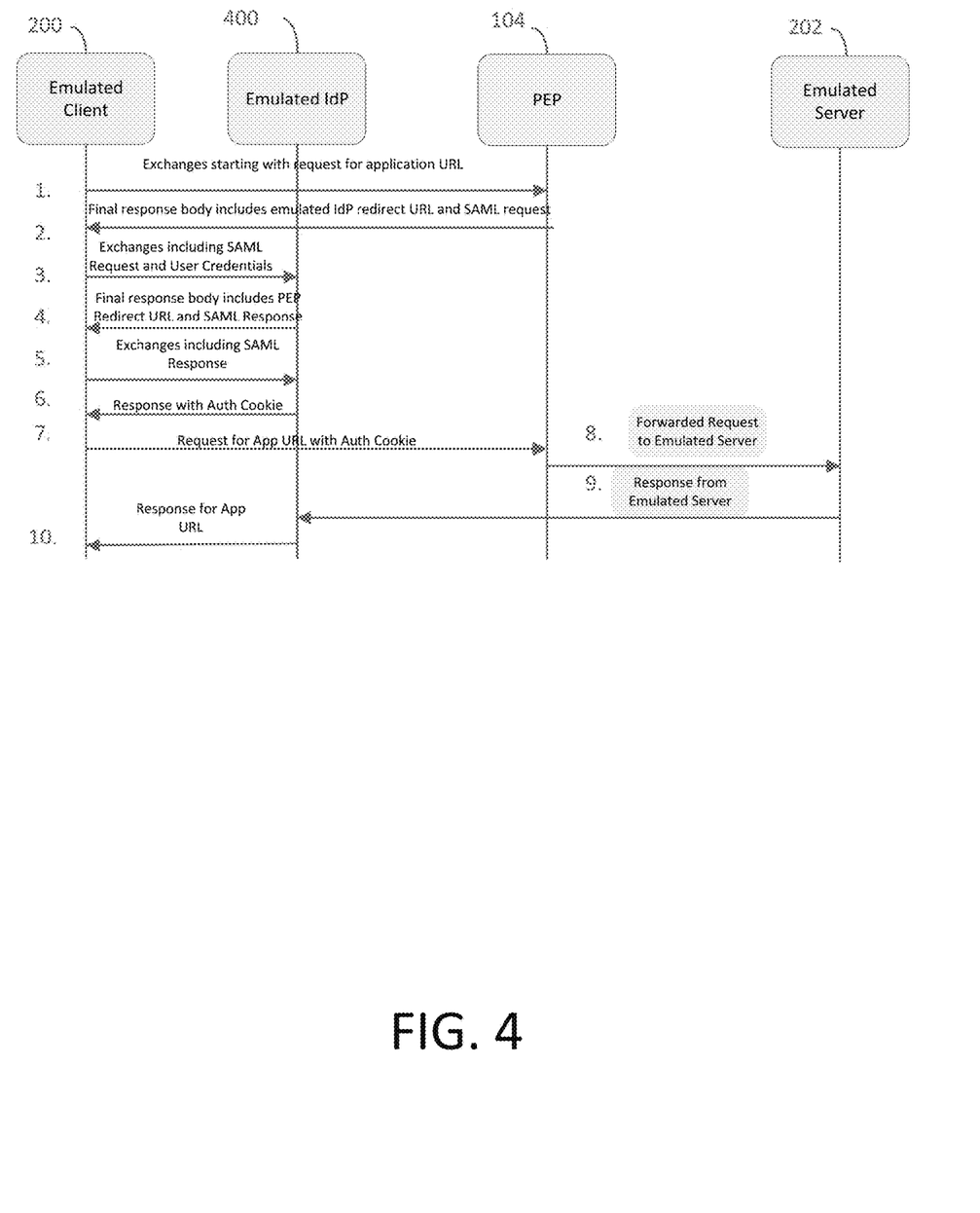
FIG. 4 is a message flow diagram illustrating exemplary messages exchanged in testing a PEP where authentication is performed using an emulated IdP.

In FIG. 3, a simulated IdP provides the authentication response internally to the emulated client. In an alternate implementation, an emulated IdP that implements the authentication protocol exchanges with the emulated client, either internally or over the network, can be used to test a PEP. In FIG. 4, an emulated IdP 400 may be co-located with and/or implemented on the same computing platform as emulated client 200. Emulated IdP 400 may implement the same functionality as a real IdP, except that emulated IdP 400 may be scalable and/or provisioned to handle an operator-selected number of simultaneous authentication exchanges with emulated clients without causing a bottleneck for performance testing of PEP 104.

Referring to the message flow in FIG. 4, in line 1, emulated client 200 attempts to access the URL of the target application residing on emulated server 202 via PEP 104. In line 2, PEP 104 redirects emulated client 200 to emulated IdP 400 and sends an SAML request to emulated client 200. In line 3, emulated client 200 implements exchanges with emulated IdP 400, including sending an SAML request and user credentials to emulated IdP 400.

If the authentication is successful, in line 4, emulated IdP 400 redirects emulated client 200 back to PEP 104. In line 5, emulated client 200 sends an SAML response to PEP 104. In line 6, PEP 104 approves the access and sends an authenticated cookie to emulated client 200. In line 7, emulated client 200 sends a request to the application residing on emulated server 202 with the authenticated cookie. In line 8, PEP 104 receives the request, verifies the cookie, and forwards the request to emulated server 202. In line 9, emulated server 202 responds to the request. In line 10, PEP 104 forwards the response to emulated client 200.

Figure 5:
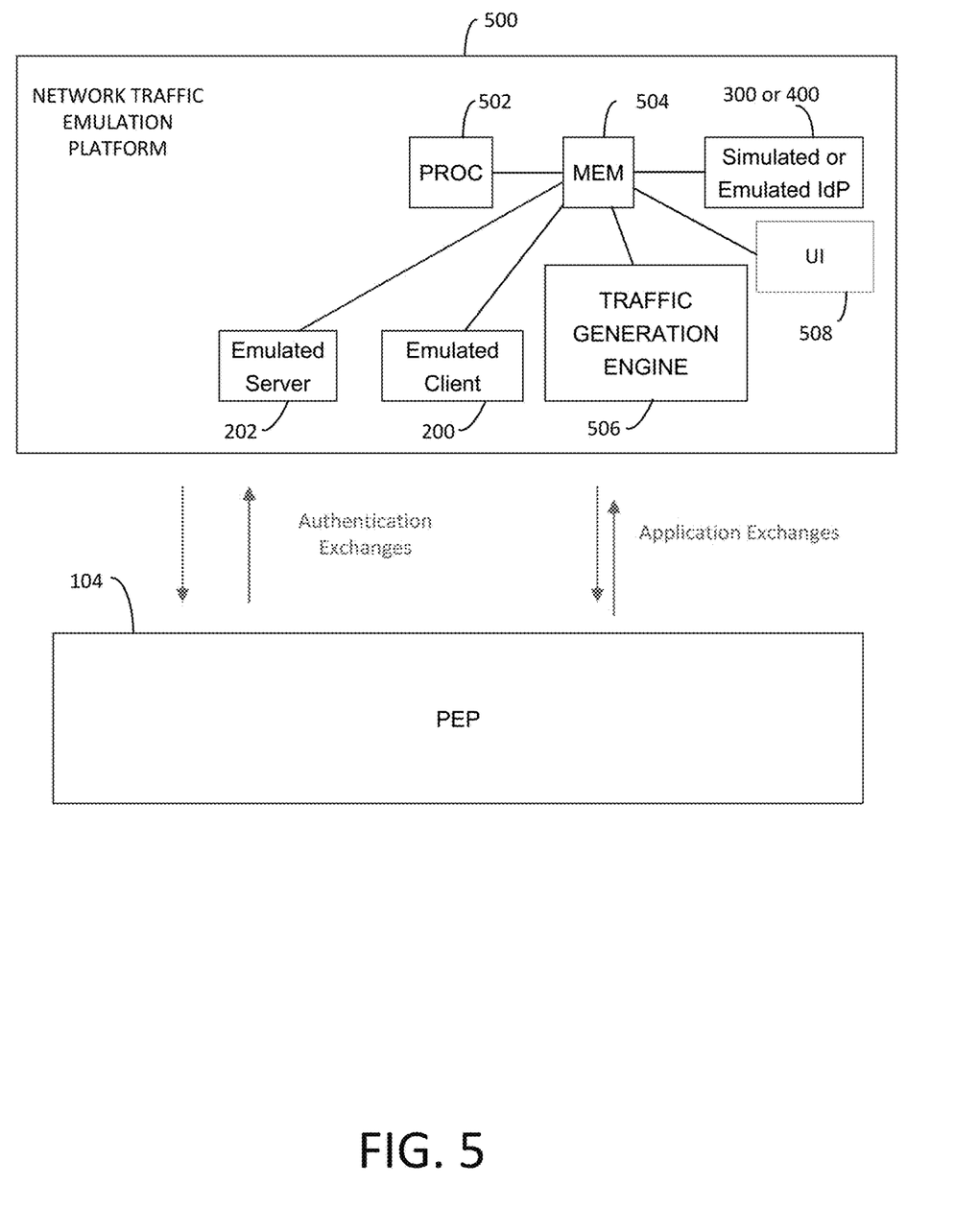
FIG. 5 is a block diagram illustrating an exemplary system for ZTNA testing using a simulated or emulated IdP.

FIG. 5 is a block diagram illustrating an exemplary architecture for a network traffic emulation system that implements an emulated client, an emulated server, and a simulated or emulated IdP. Referring to FIG. 5, network traffic emulation platform 500 includes at least one processor 502 and a memory 504. Network traffic emulation platform 500 also includes a traffic generation engine 506 that generates emulated traffic to transmit to network applications, such as emulated server 202. Network traffic emulation platform 500 includes emulated client 200, emulated server 202, and simulated or emulated IdP 300 or 400. A user interface (UI) 508 allows the user to configure emulated client 200, emulated server 202, and simulated or emulated IdP 300 or 400. In one example, emulated client 200, emulated server 202, simulated or emulated IdP 300 or 400, traffic generation engine 506, and UI 508 may be implemented using computer-executable instructions stored in memory 504 and executed by processor 502. In an alternate implementation, any one or more of emulated client 200, emulated server 202, simulated or emulated IdP 300 or 400, traffic generation engine 506, and UI 508 may be implemented separate computing platforms that are co-located with each other but with distinct processors and memory. It should also be noted that although the test system illustrated in FIG. 5 includes an emulated server, it is possible to test the functionality and performance of a PEP using a non-emulated (i.e., real) server, such as a web server, and doing so is intended to be within the scope of the subject matter described herein.

Figure 6:
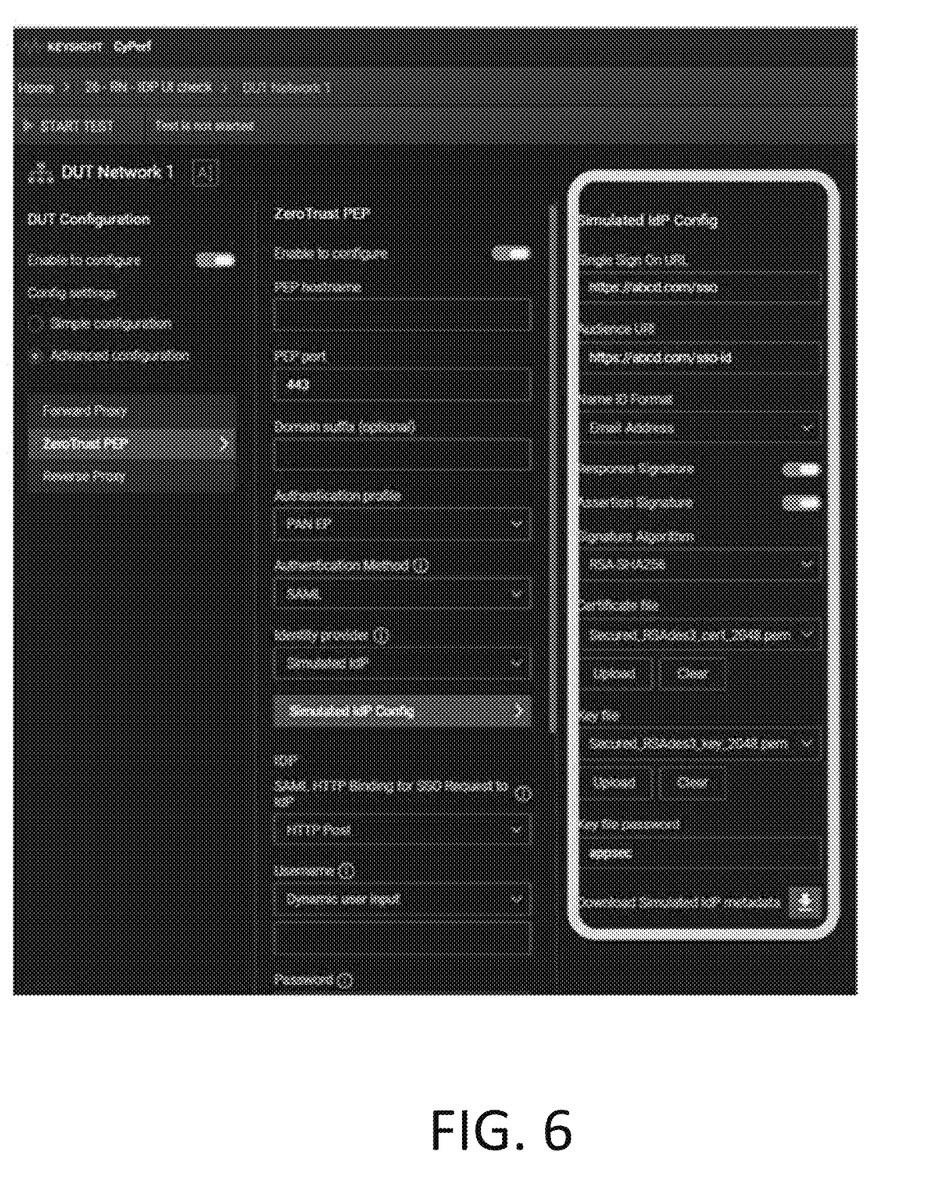
FIG. 6 is a computer screen shot illustrating an example of a configuration interface that may be provided by UI 508 to configure parameters of a simulated IdP.

FIG. 6 is a computer screen shot illustrating an example of a configuration interface that may be provided by UI 508 to configure parameters of a simulated IdP. Referring to FIG. 6, the box highlighted in yellow includes options for configuring a simulated IdP. In the illustrated example, the options include a single sign on URL, audience URL, name ID format, whether or not to require a response signature, and whether or not to require an assertion signature. The simulated IdP configuration options also include a signature algorithm to be used by the simulated IdP, a certificate file to be uploaded to the simulated IdP, a key file to be uploaded to the simulated IdP, and the key file password. The screen shot illustrated in FIG. 6 also includes some of the parameters to configure for the PEP under test, including the PEP hostname, the IdP (in this case set to "Simulated IdP"), the authentication method to use with the selected IdP, etc.

Figure 7:
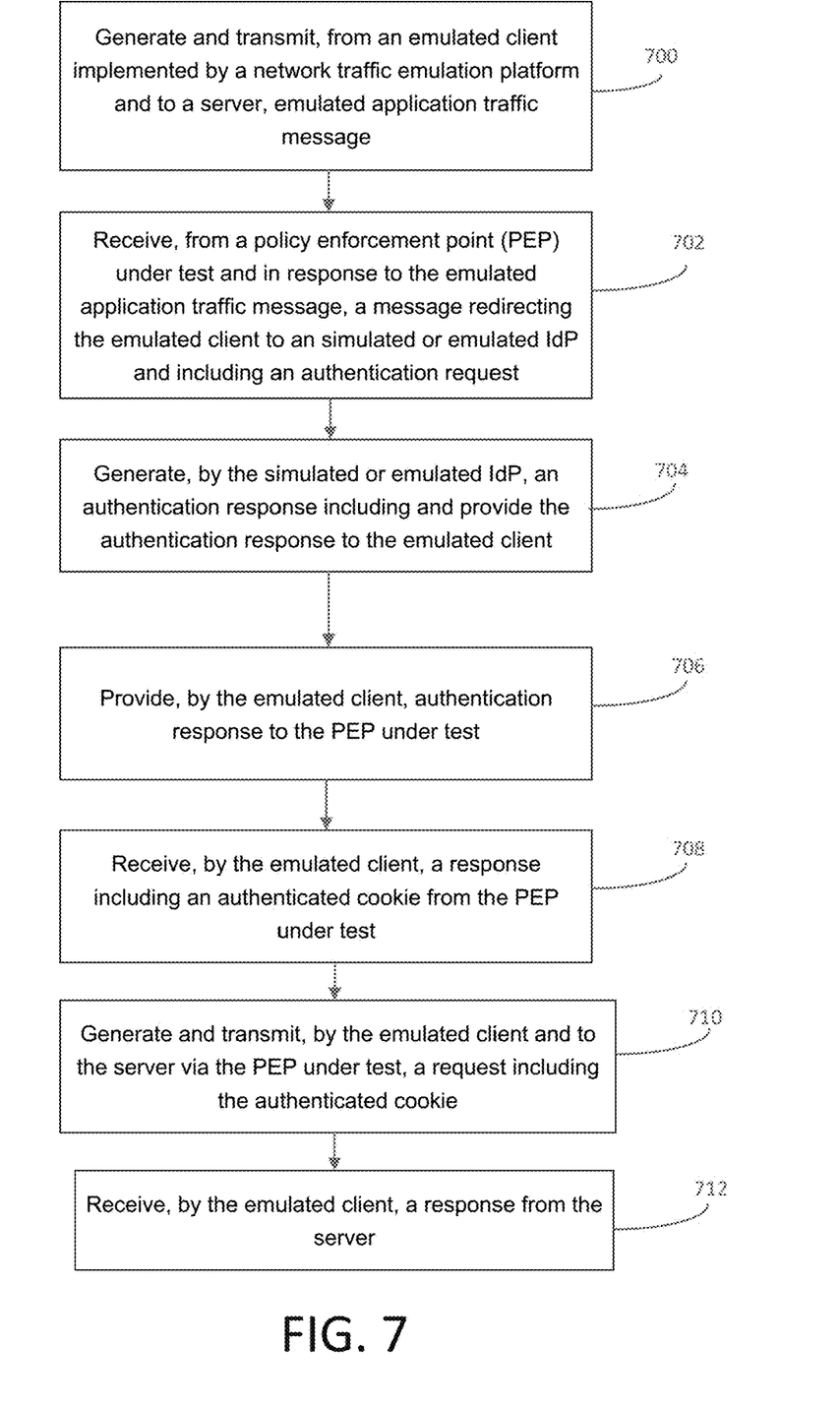
FIG. 7 is a flow chart illustrating an exemplary process for ZTNA testing using a simulated or emulated IdP.

FIG. 7 is a flow chart illustrating an exemplary process for method for ZTNA testing using a simulated or emulated IdP. Referring to FIG. 7, in step 700, the process includes generating and transmitting, from an emulated client implemented by a network traffic emulation platform and to a server, an emulated application traffic message. The emulated application traffic message may be a message to a URL on the server to access a resource on the server. The application traffic message may be formulated by network traffic emulation platform using an application profile selected by the user in setting up the test. Examples of application profiles are described in commonly-assigned, co-pending U.S. patent application Ser. No. 18/142,572, filed May 2, 2023 (hereinafter, "the '572 Application"), the disclosure of which is incorporated herein by reference in its entirety. It should be noted that any of the testing described in the '572 Application using application profiles and application-independent authentication profiles can be performed using a simulated or emulated IdP as described herein, and performing such testing is intended to be within the scope of the subject matter described herein.

In step 702, the process further includes receiving, from a policy enforcement point (PEP) under test and in response to the first emulated application traffic message, a message redirecting the emulated client to a simulated or emulated IdP and including an authentication request. For example, the message redirecting the emulated client to the simulated or emulated IdP may include the URL of the emulated IdP.

In step 704, the process further includes generating, by the simulated or emulated IdP, an authentication response and providing the authentication response to the emulated client. If the IdP is a simulated IdP, the authentication response may be provided to the emulated client internally via an API provided by the emulated client. If the IdP is an emulated IdP, the authentication response may be an application protocol response, such as an SAML response, provided to the emulated client over the network or over an internal bus of the network traffic emulation platform.

In step 706, the process includes providing, by the emulated client, an authentication response to the PEP under test. For example, the emulated client may transmit an authentication protocol response, such as an SAML response, to the PEP under test. The authentication response provided to the PEP in step 706 may be a response to the authentication request in step 702.

In step 708, the process further includes, receiving, by the emulated client, a response from the PEP under test. For example, the emulated client may receive a response to the SAML response or other authentication protocol response transmitted by the PEP under test over the network. The response approves the emulated clients access to the network.

In step 710, the process further includes, generating and transmitting, by the emulated client and to the server via the PEP under test, a request including the authenticated cookie. The request may be a request to access the URL on the server and including the authenticated cookie. The emulated client may transmit the request to the server via the PEP under test. The PEP receives the request, validates the cookie, and forwards the request to the server. The server receives the request, generates the required response, and transmits the response to the emulated client via the PEP. The PEP receives the response and forwards the response to the emulated client.

In step 712, the process further includes, receiving, by the emulated client, a response from the server. For example, the emulated client may receive the response transmitted by the server in response to the request in step 710. If the request is an HTTP GET request, the response may be a HTTP PUT request from the web server.

Using a simulated or emulated IdP as described herein is advantageous because bottlenecks in capacity testing of a PEP caused by throttling or overloading of a real IdP can be avoided. In addition, the requirement of obtaining an IdP subscription to perform the testing can also be avoided, which reduces the cost of the test bed.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for zero trust network access (ZTNA) testing using a simulated or emulated identity provider (IdP), the method comprising:
   generating and transmitting, from an emulated client implemented by a network traffic emulation platform and to a server, an emulated application traffic message;
   receiving, by the emulated client, from a policy enforcement point (PEP) under test, and in response to the emulated application traffic message, a message redirecting the emulated client to a simulated or emulated IdP and including an authentication request;
   receiving, by the simulated or emulated IdP and from the emulated client, the authentication request;
   generating, by the simulated or emulated IdP, an authentication response and providing the authentication response to the emulated client;
   providing, by the emulated client and to the PEP under test, a response to the authentication request from the PEP under test;
   receiving, by the emulated client, a response including an authenticated cookie from the PEP under test;
   generating and transmitting, by the emulated client and to the server via the PEP under test, a request including the authenticated cookie; and
   receiving, by the emulated client, a response from the server.

2. The method of claim 1 wherein the simulated or emulated IdP comprises a simulated IdP implemented by the network traffic emulation platform and wherein providing the authentication response to the emulated client includes providing the authentication response via an application programming interface (API) provided by the emulated client.

3. The method of claim 1 wherein the simulated or emulated IDP comprises an emulated IdP that implements authentication protocol exchanges with the emulated client.

4. The method of claim 3 wherein the emulated IdP is implemented on the network traffic emulation platform.

5. The method of claim 3 wherein the emulated IdP is implemented on a computing platform separate from the network traffic emulation platform.

6. The method of claim 1 wherein receiving the authentication request includes receiving a security association markup language (SAML) request.

7. The method of claim 6 wherein generating the authentication response includes generating an SAML response.

8. The method of claim 1 comprising, at the network traffic emulation platform, simultaneously emulating a plurality of flows between emulated clients and servers including authentication flows with one or more simulated or emulated IdPs.

9. The method of claim 1 wherein the server comprises an emulated server.

10. The method of claim 1 wherein the server comprises a non-emulated server.

11. A system for zero trust network access (ZTNA) testing using a simulated or emulated identity provider (IdP), the system comprising:
    a network traffic emulation platform including at least one processor and a memory;
    a simulated or emulated IdP;
    an emulated client implemented by the at least one processor for generating and transmitting, to a server, an emulated application traffic message, receiving, from a policy enforcement point (PEP) under test and in response to the emulated application traffic message, a message redirecting the emulated client to the simulated or emulated IdP and including an authentication request;
    wherein the emulated client is configured to provide the authentication request to the simulated or emulated IdP;
    wherein the simulated or emulated IdP is configured to generate an authentication response and provide the authentication response to the emulated client; and
    wherein the emulated client is configured to provide to the PEP under test, a response to the authentication request from the PEP under test, receive a response including an authenticated cookie from the PEP under test, generate and transmit, to the server via the PEP under test, a request including the authenticated cookie, and receive a response from the server.

12. The system of claim 11 wherein the simulated or emulated IdP comprises a simulated IdP implemented by the network traffic emulation platform and wherein providing the authentication response to the emulated client includes providing the authentication response via an application programming interface (API) provided by the emulated client.

13. The system of claim 11 wherein the simulated or emulated IdP comprises an emulated IdP that implements authentication protocol exchanges with the emulated client.

14. The system of claim 13 wherein the emulated IdP is implemented on the network traffic emulation platform.

15. The system of claim 13 wherein the emulated IdP is implemented on a computing platform separate from the network traffic emulation platform.

16. The system of claim 11 wherein the authentication request includes a security association markup language (SAML) request.

17. The system of claim 16 wherein the authentication response includes an SAML response.

18. The system of claim 11 wherein the network traffic emulation platform is configured to simultaneously emulate a plurality of flows between emulated clients and servers including authentication flows with one or more simulated or emulated IdPs.

19. The system of claim 11 wherein the server comprises an emulated server or a non-emulated server.

20. A non-transitory computer-readable medium having stored thereon executable instructions that when executed by a processor of a computer control the computer to perform steps comprising:

generating and transmitting, from an emulated client implemented by a network traffic emulation platform and to a server, an emulated application traffic message;

receiving, by the emulated client, from a policy enforcement point (PEP) under test, and in response to the emulated application traffic message, a message redirecting the emulated client to a simulated or emulated identity provider (IdP) and including an authentication request;

receiving, by the simulated or emulated IdP and from the emulated client, the authentication request;

generating, by the simulated or emulated IdP, an authentication response and providing the authentication response to the emulated client;

providing, by the emulated client and to the PEP under test, a response to the authentication request from the PEP under test;

receiving, by the emulated client, a response including an authenticated cookie from the PEP under test;

generating and transmitting, by the emulated client and to the server via the PEP under test, a request including the authenticated cookie; and receiving, by the emulated client, a response from the server.

\* \* \* \* \*